UNITED STATES PATENT OFFICE.

ALBERT CLAUSIUS, OF DESSAU IN ANHALT, BERNHARD SCHÖNER, OF BARACKENLAGER ROTHEMARK, NEAR WITTENBERG, AND OTTO SIEBERT, OF DESSAU IN ANHALT, GERMANY, ASSIGNORS TO ACTIEN GESELLSCHAFT FÜR ANILIN FABRIKATION, OF BERLIN, GERMANY.

DISAZO DYES.

1,213,075.  Specification of Letters Patent.  Patented Jan. 16, 1917.

No Drawing.   Application filed August 26, 1916.   Serial No. 117,105.

*To all whom it may concern:*

Be it known that we, ALBERT CLAUSIUS, BERNHARD SCHÖNER, and OTTO SIEBERT, citizens of the Empire of Germany, residing, respectively, at Dessau in Anhalt, Germany, Barackenlager Rothemark, near Wittenberg, Germany, and Dessau in Anhalt, Germany, have invented certain new and useful Improvements in the Manufacture of Disazo Dyes, of which the following is a specification.

This invention relates to new disazo dyes which derive from a derivative of 2-aminophenol containing the nitro group, 2-amino-5-naphthol-7-sulfonic acid and an alkyl-aralkyl-arylamin sulfonic acid and correspond to the general formula:

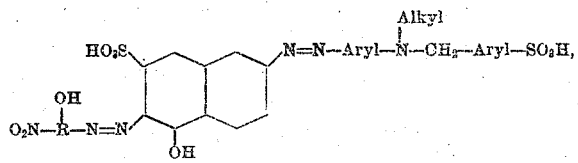

where R means a radical of the benzene series substituted or not. These new dyes in the shape of pulverized dry sodium salts are blackish powders, soluble in water with a violet color changing to red by ammonium- or sodium-hydroxid. The aqueous solution becomes reddish on addition of hydrochloric acid and the dye separates. Concentrated sulfuric acid dissolves the dyes to green solutions, the addition of ice changes the color over blue and violet to reddish and effects the precipitation of the dyes. Strong reducing agents destroy the dyes yielding a diaminophenol-compound, 2.6-diamino-5-naphthol-7-sulfonic acid and an aminoaryl-alkyl-aralkylamin sulfonic acid.

The new dyes furnish on wool from an acid bath violet tints which by a treatment with a suitable chromium compound, such as alkali metal bichromate, turn to black shades of an excellent fastness to light, to washing and to milling.

In order to illustrate in which manner the dyes may be manufactured, without limiting the invention, the following examples are given, the parts being by weight:

1. 15.4 parts of 4-nitro-2-aminophenol are diazotized by means of 50 parts of hydrochloric acid of 12° Bé. and 6.9 parts of sodium nitrite and combined with 24 parts of 2-amino-5-naphthol-7-sulfonic acid in the presence of sodium carbonate. The separated intermediate product is suspended in 700 parts of water. Then 7 parts of sodium nitrite and ice are added and 70 parts of hydrochloric acid of 12° Bé. are poured into the mixture. After stirring during 2 hours at 0° C. the diazo compound is allowed to flow into a solution of 30 parts of ethylbenzylanilin-4'-sulfonic acid and 40 parts of calcined sodium carbonate in 500 parts of water. When the reaction is complete the disazo dye is salted out and dried. Its constitution in the free state may be given by the formula:

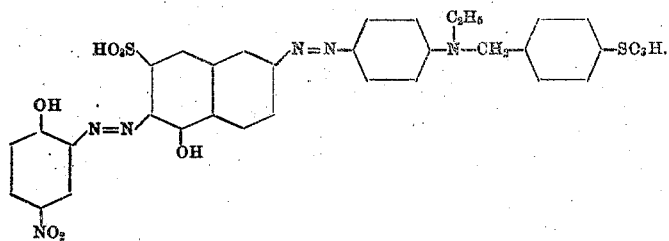

2. The diazo compound prepared from 23.4 parts of 4-nitro-2-aminophenol-6-sulfonic acid is coupled with 24 parts of 2-amino-5-naphthol-7-sulfonic acid in the presence of sodium carbonate. The intermediate product is acidified with hydrochloric acid and during 3 hours diazotized at 0° C. with 30 parts of hydrochloric acid of 12° Bé. and 7 parts of sodium nitrite. Then the combination is effected with 30 parts of ethylbenzylanilin-4'-sulfonic acid, dissolved with 35 parts of calcined sodium carbonate in 600 parts of water. The disazo dye is worked as usual. The following formula indicates its constitution in the free state:

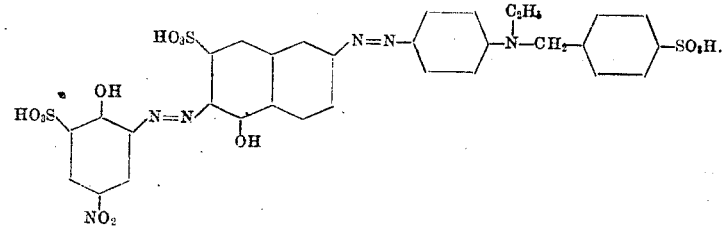

In the foregoing examples as starting materials for instance 4.6-dinitro-2-aminophenol or 6-nitro-2-aminophenol-4-sulfonic acid may be used. Instead of ethylbenzylanilin-4'-sulfonic acid with the same effect methylbenzylanilin-4'-sulfonic acid may be used.

Having now described our invention and the manner in which it may be carried out what we claim is,—

1. The new disazo dyes which derive from a derivative of 2-aminophenol containing the nitro-group, 2-amino-5-naphthol-7-sulfonic acid and alkyl-aralkyl-arylamin-sulfonic acid and correspond to the general formula:

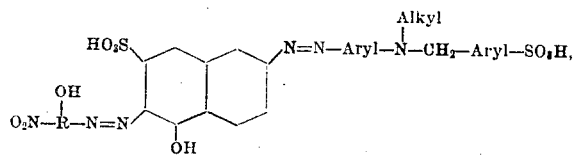

where R means a radical of the benzene series substituted or not; in the shape of pulverized dry sodium salts being blackish powders soluble in water with a violet color changing to red by ammonium- or sodium-hydroxid; the aqueous solution becoming reddish and separating the dye when acidified by hydrochloric acid; soluble in concentrated sulfuric acid to green solutions which on addition of ice change the color over blue and violet to reddish the dyes being precipitated; being destroyed by strong reducing agents yielding a diaminophenol compound, 2.6-diamino-5-naphthol-7-sulfonic acid and an aminoaryl-alkyl-aralkylamin-sulfonic acid; dyeing wool from an acid bath violet tints which by a treatment with an alkali metal bichromate turn to black shades.

2. The new disazo dye which derives from 4 nitro-2-aminophenol, 2-amino-5-naphthol-7-sulfonic acid and ethylbenzylanilin-4'-sulfonic acid and probably corresponds to the formula:

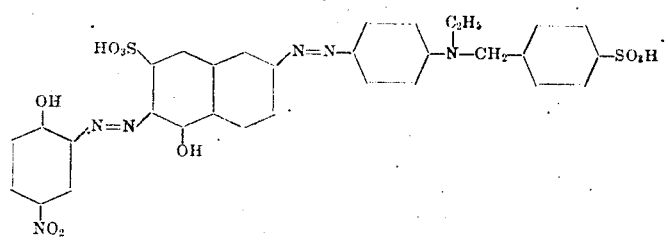

in the shape of pulverized dry sodium salt being a blackish powder, soluble in water with a violet color changing to red by ammonium- or sodium-hydroxid; the aqueous solution becoming reddish and separating the dye when acidified by hydrochloric acid; soluble in concentrated sulfuric acid to a green solution which on addition of ice changes the color over blue and violet to reddish, the dye being precipitated; being destroyed by strong reducing agents yielding 2.4-diaminophenol, 2.6-diamino-5-naphthol-7-sulfonic acid and 4-aminoaryl-ethylbenzylamin-4'-sulfonic acid; dyeing wool from an acid bath violet tints which by a treatment with an alkali metal bichromate turn to black shades.

In testimony whereof we affix our signatures in presence of two witnesses.

ALBERT CLAUSIUS.
BERNHARD SCHÖNER.
OTTO SIEBERT.

Witnesses:
 WILHELM MÜHLENBERG.
 N. BRUCE WALLACE.